(No Model.) 2 Sheets—Sheet 1.
H. H. DOW.
PROCESS OF EXTRACTING BROMINE.
No. 460,370. Patented Sept. 29, 1891.
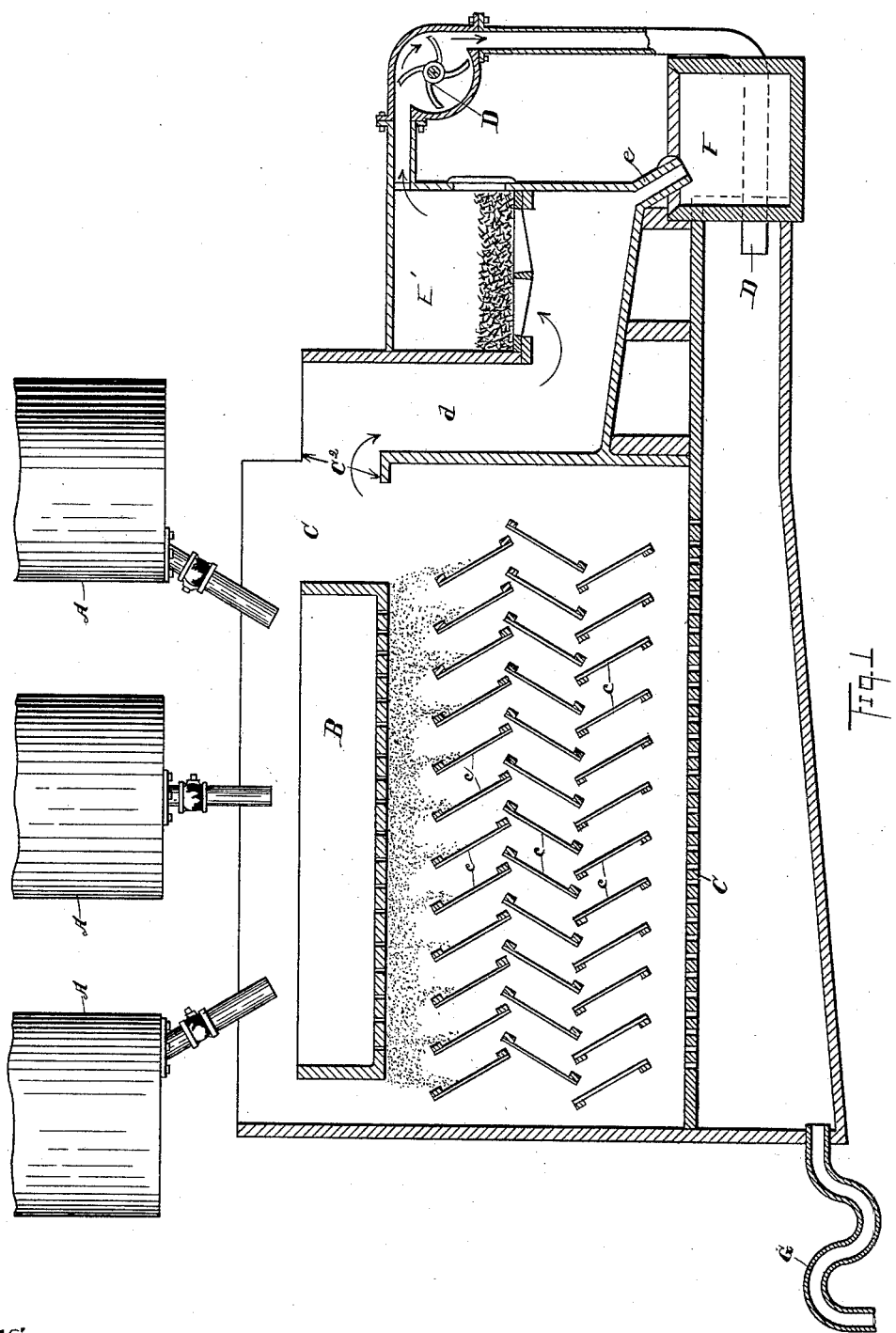
Witnesses:
Belle S. Lowris
Will P. Sage
Inventor
Herbert H. Dow.
Leggett and Leggett.
Attorneys

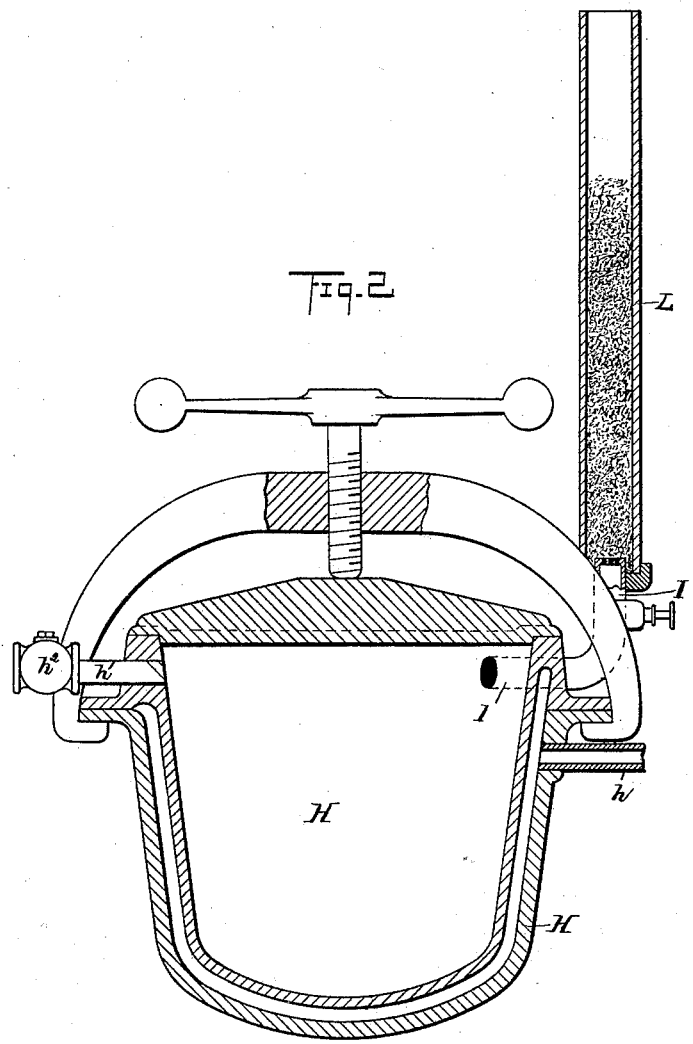

UNITED STATES PATENT OFFICE.

HERBERT H. DOW, OF CLEVELAND, OHIO.

PROCESS OF EXTRACTING BROMINE.

SPECIFICATION forming part of Letters Patent No. 460,370, dated September 29, 1891.

Application filed October 28, 1889. Serial No. 328,366. (No specimens.)

*To all whom it may concern:*

Be it known that I, HERBERT H. DOW, of Cleveland, in the county of Cuyahoga and State of Ohio, have invented a certain new and useful Process of Extracting Bromine from Natural Brine or Bitter Waters; and I do hereby declare the following to be a full, clear, and exact description of the invention, such as will enable others skilled in the art to which it pertains to make and use the same.

My invention relates to a new process of extracting bromine from natural brine or from bitter water, as the case may be; and it consists in the steps hereinafter described and claimed. Many salt-wells will not pay for working for salt, owing to the low price of the latter commodity. The brine from some of these wells is rich in bromine, and it is a matter of much commercial value to be able to cheaply recover the bromine from the brine without incurring the expense of evaporating the water of the brine; and my improved process has this end in view, although the process is equally well adapted to working bitter waters where the brine has been worked for salt.

My process, in brief, consists, first, in setting the bromine free from its chemical combinations in the brine, and this may be done by various means—for example, by electricity, or by the agency of chlorine gas, or by introducing into the brine the equivalents of chlorine gas, to wit: first introducing sulphuric acid, followed by the ordinary bleaching-powder of commerce. By means either of electricity, chlorine gas, or of the aforesaid chemicals the bromine is set free from its chemical combination, leaving the bromine in solution in the brine; second, the bromine is recovered from its soluble condition in the brine by means of air-currents brought in contact with the brine, the bromine being absorbed and carried away by the air, and subsequently the bromine is recovered from the air by bringing such bromine-laden air in contact with such substance as will readily form a chemical combination with the bromine. For instance, by passing such bromine-laden air through a body of iron-turnings the bromine and iron will chemically unite, forming bromide of iron, known as "ferric bromide," which, with the moisture simultaneously absorbed from the air, will form a solution, and such ferric-bromide solution is an article of commerce and may be shipped in such condition. In case it is desired to ship the bromine in solid condition it may be converted into ferrous bromide, which is a more staple compound when heated than the ferric bromide by bringing the aforesaid solution in contact with iron, and subsequently evaporating it to dryness in a vessel from which the air is excluded by steam or by other means, the product being a solid, $(FeBr_2.)$ In place of the iron-turnings aforesaid for recovering the bromine from the air by substituting other metals or substance having an affinity for the bromine, other compounds of bromine may be had—such, for instance, as bromide of zinc, bromide of copper, calcium bromide and bromate, sodium bromide and bromate, &c. Also, other aeriform bodies other than atmospheric air may be used for recovering the bromine from the brine—for instance, natural or artificial gas—where these may be had at small cost; but this must not be confounded with the use of chlorine gas in the first stages of the process for setting the bromine free from the chemical combination in the brine.

In the accompanying drawings is illustrated suitable apparatus for carrying out my invention, although such apparatus may be varied almost indefinitely. Figure 1 is an end elevation in section. Fig. 2 is an elevation in transverse section taken through the center of the apparatus employed in the latter stages of the process.

A are storage-tanks for the brine and in which the brine is treated by electricity or with chlorine gas or by chemicals that are substantially the equivalents of chlorine gas—for instance, sulphuric acid and common bleaching-powder for freeing the bromine from its chemical combinations in the brine, and this is usually done in one storage-tank at a time. After such treatment the brine is drawn off into a shallow tank B, and during the drawing off of the one storage-tank probably the brine in another storage-tank will be undergoing the treatment just referred to. Meanwhile possibly a third tank is filled with brine, so that the process may be continuous. Tank B is preferably located in a closed room C near the upper portion thereof, this tank B having a series of drip-holes, from which the brine is showered down preferably upon sheets of burlap stretched upon frames c in the inclined position shown. In place of burlap wooden surfaces may be employed; but the burlap is preferable on account of the greater surface exposed to the air.

D is a blower for furnishing the air that is circulated through room C, the discharge-pipe D' of this blower entering, as shown, near the bottom of room C, this air passing up through a perforated floor C'. The air on entering the room from below first engages brine that has been nearly depleted of bromine and the fresh air absorbs this remnant of bromine almost to the last degree. As the air passes upward it comes in contact with brine richer with bromine, and at last comes in contact with the brine that is showered down, containing its full amount of bromine, and hence the air in passing off through opening $C^2$ has been laden with bromine to its full extent. The air passes off through duct $d$ and is conducted through the bottom of container E', this container being partially filled, for instance, with iron-turnings or scrap-iron, in which case the bromine uniting with the iron will form bromide of iron, known as "ferric bromide," and simultaneously therewith the moisture of the atmosphere will be absorbed by the ferric bromide forming a solution, and this ferric-bromide solution drips down and is discharged through spout $e$ into vessel F, the latter being preferably of stone. Vessel E' is covered and the exhaust-pipe of the blower connects with this vessel. Hence the air of this vessel, after passing the iron and having been freed from the bromine, is again returned to the bottom of room C, and so the process goes on. In case other than atmospheric air is used—such, for instance, as natural or artificial gas—the operation is the same. The lower floor of the room is shown inclined, with the discharging-spout G in the form of a trap for drawing off the waste brine without wasting the air.

If, in place of iron, other substance having a strong affinity for bromine be introduced into vessel E', other compounds of bromine will of course be formed.

The specific compound of bromine that is formed is of secondary importance, the main object being to get the bromine in some concentrated form, from which by subsequent processes the various bromides used in the arts can be made.

For reducing the ferric-bromide solution aforesaid to ferrous bromide the liquid from container F is poured into tower L, the latter being filled with iron turnings, scrap, or iron in some form. The tower terminates in a tube $l$, discharging into vessel H. This vessel has a steam-jacket H' for heating the vessel, and has a removable cover $H^2$, together with the usual appliances for hermetically sealing the vessel and steam-jacket. A steam-pipe $h$ leads into the steam-space of the jacket. The pipe $h'$ leads into vessel H, near the top of the latter, this latter pipe having a suitable check-valve $h^2$, that allows vapor to escape from the vessel, but prevents the ingress of air from the outside. The ferric bromide as it percolates through the iron in tower L absorbs more iron, thus converting the product into ferrous bromide, this liquid being discharged into vessel H, the latter being filled with an atmosphere of steam produced by boiling a quantity of water in the vessel, so as to expel the air previous to the introduction of the ferrous bromide. This latter solution is boiled to dryness and afterward allowed to cool. The cover of the vessel is then removed and the solid product is taken out of the vessel, the air having no decomposing effect on the solid dry product.

I am aware of United States Letters Patent, Reissue No. 3,479, granted to Amalie Stieren June 1, 1869; but in the process therein described for obtaining bromine there is no mention of gas of any kind, except chlorine gas, used for the purpose of freeing the bromine from its chemical combination in the brine, and there is nothing said of employing atmospheric air or gas of any kind to recover the bromine thus set free, and there is nothing in the patent that would even suggest the same.

What I claim is—

1. The process herein described of extracting bromine from brine or bitter water and reducing the product to a solid bromide, consisting, first, in freeing the bromine from its chemical combination; second, separating the bromine from the brine by means of an air-blast; third, forcing the bromine-laden air through a metal or substance that will combine with the bromine, thus producing a bromide, and finally boiling the latter to dryness out of contact with the air, substantially as set forth.

2. The improvement in the art of obtaining bromine from natural salt-water, which consists in heating such salt-water to set the bromine free from its chemical combination, then separating the freed bromine from the salt-water by means of an air-blast, and finally absorbing the bromine from the air with suitable absorbing material.

In testimony whereof I sign this specification, in the presence of two witnesses, this 12th day of October, 1889.

HERBERT H. DOW.

Witnesses:
C. H. DORER,
S. G. NOTTINGHAM.